United States Patent
Kim et al.

(10) Patent No.: US 9,217,899 B2
(45) Date of Patent: Dec. 22, 2015

(54) NANOCRYSTAL DISPLAY

(71) Applicant: Samsung Display Co., Ltd., Yongin, Gyeonggi-Do (KR)

(72) Inventors: Hoonsik Kim, Seoul (KR); YeoGeon Yoon, Suwon-si (KR); SuWan Woo, Osan-si (KR); Younggoo Song, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 333 days.

(21) Appl. No.: 13/850,789

(22) Filed: Mar. 26, 2013

(65) Prior Publication Data

US 2014/0125910 A1    May 8, 2014

(30) Foreign Application Priority Data

Nov. 2, 2012  (KR) .................. 10-2012-0123601

(51) Int. Cl.
| | | |
|---|---|---|
| *G02F 1/1368* | (2006.01) | |
| *G02F 1/1343* | (2006.01) | |
| *G02F 1/1333* | (2006.01) | |
| *G02F 1/1362* | (2006.01) | |

(52) U.S. Cl.
CPC .... *G02F 1/134336* (2013.01); *G02F 1/133377* (2013.01); *G02F 1/136209* (2013.01); *G02F 2001/13685* (2013.01); *G02F 2001/136222* (2013.01)

(58) Field of Classification Search
CPC .................. G02F 1/133377; G02F 1/134336; G02F 2001/13685; G02F 2001/136222; G02F 1/136209

USPC ......... 349/110, 122, 137, 139, 143, 146, 160, 349/187
See application file for complete search history.

(56) References Cited

U.S. PATENT DOCUMENTS

| | | | | |
|---|---|---|---|---|
| 5,668,649 | A | * | 9/1997 | Suzuki et al. .................... 349/42 |
| 6,157,426 | A | * | 12/2000 | Gu ................................. 349/111 |
| 7,259,806 | B1 | * | 8/2007 | Lee et al. ......................... 349/43 |
| 2002/0018278 | A1 | | 2/2002 | Sato |
| 2004/0125286 | A1 | | 7/2004 | Moon et al. |
| 2004/0160544 | A1 | | 8/2004 | Dai |
| 2005/0168671 | A1 | | 8/2005 | Lee et al. |
| 2007/0146581 | A1 | | 6/2007 | Lee et al. |
| 2011/0157535 | A1 | * | 6/2011 | Chen et al. ..................... 349/143 |

(Continued)

FOREIGN PATENT DOCUMENTS

| | | |
|---|---|---|
| JP | 2000231123 A | 8/2000 |
| JP | 2006267264 A | 10/2006 |

(Continued)

*Primary Examiner* — Dung Nguyen
*Assistant Examiner* — Tai Duong
(74) *Attorney, Agent, or Firm* — Cantor Colburn LLP

(57) ABSTRACT

A nanocrystal display includes a display panel including a plurality of pixels; and a substrate including a plurality of pixel areas corresponding to the plurality of pixels, and a boundary area between the pixel areas. Each pixel includes a first electrode on an upper surface of the substrate and in a corresponding pixel area; a second electrode on the upper surface of the substrate and spaced apart from the first electrode in a cross-section direction, a tunnel-shaped cavity defined in the plurality of pixel areas and spaced apart from the substrate by a predetermined distance; and an image display layer in the tunnel-shaped cavity; and a backlight unit which provides a light to the display panel and faces the upper surface of the substrate.

17 Claims, 7 Drawing Sheets

(56) References Cited

U.S. PATENT DOCUMENTS

| | | | |
|---|---|---|---|
| 2012/0062448 A1* | 3/2012 | Kim et al. | 345/55 |
| 2012/0140139 A1 | 6/2012 | Zhang et al. | |
| 2013/0308071 A1* | 11/2013 | Kim et al. | 349/43 |
| 2013/0313582 A1* | 11/2013 | Cho et al. | 257/88 |
| 2014/0055721 A1* | 2/2014 | Choi et al. | 349/96 |

FOREIGN PATENT DOCUMENTS

| | | |
|---|---|---|
| KR | 1020030069342 A | 8/2003 |
| KR | 1020060038148 A | 5/2006 |
| KR | 1020080069798 A | 7/2008 |
| KR | 1020100137272 A | 12/2010 |
| KR | 1020110111708 A | 10/2011 |

\* cited by examiner

NANOCRYSTAL DISPLAY

This application claims priority to Korean Patent Application No. 10-2012-0123601, filed on Nov. 2, 2012, and all the benefits accruing therefrom under 35 U.S.C. §119, the contents of which are hereby incorporated by reference.

BACKGROUND

1. Field

The invention relates to a nanocrystal display. More particularly, the invention relates to a nanocrystal display having improved durability.

2. Description of the Related Art

Various display devices, such as a liquid crystal display device, an organic light emitting diode display device, an electrowetting display device, an electrophoretic display device, a nanocrystal display device, etc., have been developed.

In general, the display device includes a plurality of pixels to display an image. The pixels receive data signals in response to gate signals and display gray scales corresponding to the data signals.

The liquid crystal display device includes two substrates, and a liquid crystal layer interposed between the two substrates. The two substrates are spaced apart from each other by a spacer to accommodate the liquid crystal layer therebetween. The spacer is disposed on one of the two substrates and the other one of the two substrates is attached to the spacer using an adhesive.

SUMMARY

One or more exemplary embodiment of the invention provides a nanocrystal display device having improved durability.

An exemplary embodiment of the invention provides a nanocrystal display device including a display panel and a backlight unit. The display panel includes a plurality of pixels; and a substrate including a plurality of pixel areas corresponding to the plurality of pixels, and a boundary area between the pixel areas. Each pixel includes a first electrode on an upper surface of the substrate and in a corresponding pixel area; a second electrode on the upper surface of the substrate and spaced apart from the first electrode in a cross-section direction; a tunnel-shaped cavity defined in the plurality of pixel areas and spaced apart from the substrate by a predetermined distance; and an image display layer in the tunnel-shaped cavity. The backlight unit provides a light to the display panel and faces the upper surface of the substrate.

The each pixel may further include a gate line disposed on the substrate and extended in the row direction, a data line extended in a column direction and insulated from the gate line while crossing the gate line, and a thin film transistor connected to the first electrode, the gate line and the data line.

The thin film transistor may include a gate electrode branched from the gate line, a source electrode branched from the data line, and a drain electrode connected to the first electrode.

The display panel may further include a black matrix disposed on the thin film transistor in the boundary area, a color filter disposed on the substrate in the pixel areas, and a contact hole defined in the black matrix. The first electrode is disposed on the color filter, and the drain electrode of the thin film transistor is electrically connected to a connection electrode branched from the first electrode through the contact hole.

The second electrode may contact the black matrix in the boundary area, and may be spaced apart from the color filter in an area where the second electrode overlaps the pixel areas, to define the tunnel-shaped cavity.

The display panel may further include an insulating layer disposed on the black matrix and the color filter, to cover the first electrode. The second electrode may contact the insulating layer in the boundary area, and may be spaced apart from the insulating layer in an area where the second electrode overlaps the pixel areas, to define the tunnel-shaped cavity.

The display panel may further include an anti-reflection layer disposed between the upper surface of the substrate and the gate electrode, and having a reflectivity lower than a reflectivity of the gate electrode.

A width of the anti-reflection layer may be substantially the same as a width of the gate electrode.

A width of the anti-reflection layer may be substantially the same as a width of the gate line, may be extended in a same direction as the gate line and may be between the gate line and the substrate.

The anti-reflection layer may include chromium oxide.

The anti-reflection layer has a reflectivity in a range from about zero (0) % to about 20%.

The display panel may further include a roof layer extended in the row direction to cover an upper surface of the second electrode, and a sealant layer disposed on the roof layer. The backlight unit may be disposed on the sealant layer.

The tunnel-shaped cavity may be elongated in the column direction, both opposing ends of the tunnel-shaped cavity in the column direction may be open, which expose the image display layer in the tunnel-shaped cavity, and the sealant layer may cover the substrate and block the both opposing ends of the tunnel-shaped cavity to seal the tunnel-shaped cavity.

The image display layer may be a liquid crystal layer or an electrophoretic layer.

The first electrode includes a cross-shaped open trunk portion, a plurality of branch portions extended from the trunk portion toward an outer portion, in radius form, and a plurality of fine slits disposed between adjacent branch portions.

According to the above, a nanocrystal display device includes a display panel having elements disposed on a same surface of a substrate, and a backlight unit facing that same surface of the substrate. Since the substrate is stronger than the elements of the display panel and is positioned at a viewing side of the display device, an external impact is applied to the substrate which is not deformed easily. Thus, the durability of the nanocrystal display device may be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
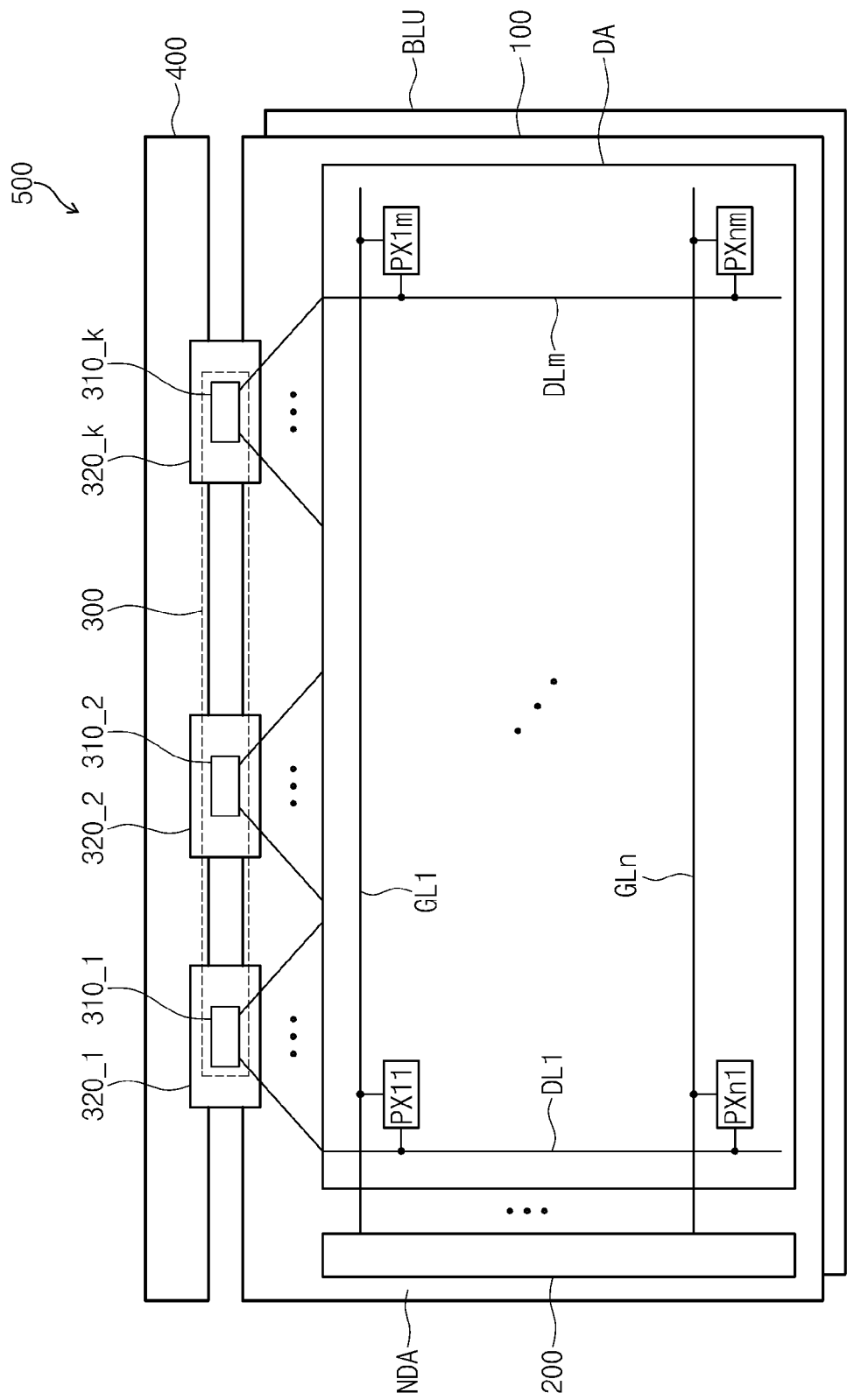
FIG. 1 is a plan view showing an exemplary embodiment of a nanocrystal display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is a plan view showing an exemplary embodiment of a nanocrystal display device according to the invention.

Referring to FIG. 1, a nanocrystal display device 500 includes a display panel 100, a gate driver 200, a data driver 300, a driving circuit board 400 and a backlight unit BLU.

The display panel 100 includes a display area DA in which a plurality of pixels PX11 to PXnm arranged in a matrix form, a non-display area NDA surrounding the display area DA, a plurality of gate lines GL1 to GLn, and a plurality of data lines DL1 to DLm insulated from the gate lines GL1 to GLn while crossing the gate lines GL1 to GLn.

The gate lines GL1 to GLn are connected to the gate driver 200 to sequentially receive gate signals. The data lines DL1 to DLm are connected to the data driver 300 to receive data voltages in analog form.

In one exemplary embodiment, the pixels PX11 to PXnm are disposed in areas defined in association with the gate lines GL1 to GLn crossing the data lines DL1 to DLm, however, the invention is not limited thereto or thereby. As illustrated in FIG. 1, the pixels PX11 to PXnm are arranged in "n" rows by "m" columns. Each of the "m" and "n" is an integer number greater than zero (0).

Each of the pixels PX11 to PXnm is connected to a corresponding gate line of the gate lines GL1 to GLn and a corresponding data line of the data lines DL1 to DLm. Each pixel PX11 to PXnm receives a data voltage provided through the corresponding data line in response to a gate signal provided through the corresponding gate line. As a result, each pixel PX11 to PXnm displays a gray scale corresponding to the data voltage.

The gate driver 200 is disposed in the non-display area NDA adjacent to a side of the display area DA. In detail, the gate driver 200 is disposed on the non-display area NDA adjacent to a left side of the display area DA. The gate driver 200 may be mounted on the non-display area NDA in an amorphous silicon gate ("ASG") driver circuit form. The gate driver 200 generates the gate signals in response to a gate control signal provided from a timing controller (not shown). The timing controller may be mounted on the driving circuit substrate 400, but is not limited thereto or thereby. The gate signals are sequentially applied to the pixels PX11 to PXnm through the gate lines GL1 to GLn in a unit of a row of pixels PX, for example, in a row-by-row basis. As a result, the pixels PX11 to PXnm may be driven in the unit of a row of pixels PX.

The data driver 300 receives image signals and a data control signal from the timing controller. The data driver 300 generates analog data voltages corresponding to the image signals in response to the data control signal. The data driver 300 applies the data voltages to the pixels PX11 to PXnm through the data lines DL1 to DLm. The data driver 300 includes a plurality of source driving chips 310_1 to 310_k. The "k" is an integer number greater than zero and smaller than "m". The source driving chips 310_1 to 310_k are mounted on flexible printed circuit boards 320_1 to 320_k. The source driving chips 310_1 to 310_k are connected between the driving circuit board 400, and the non-display area NDA adjacent to an upper side of the display area DA.

In the illustrated exemplary embodiment, the source driving chips 310_1 to 310_k are mounted on the flexible circuit boards 320_1 to 320_k, e.g., in a tape carrier package ("TCP") method, but are not be limited thereto or thereby. That is, in an alternative exemplary embodiment, the source driving chips 310_1 to 310_k may be mounted on the non-display area NDA adjacent to the upper side of the display area DA by using a chip-on-glass ("COG") method.

The backlight unit BLU is disposed under the display panel 100 to provide light to the display panel 100. The backlight unit BLU includes a light source (not shown) emitting the light, e.g., a fluorescent lamp or a light emitting diode.

Figure 2:
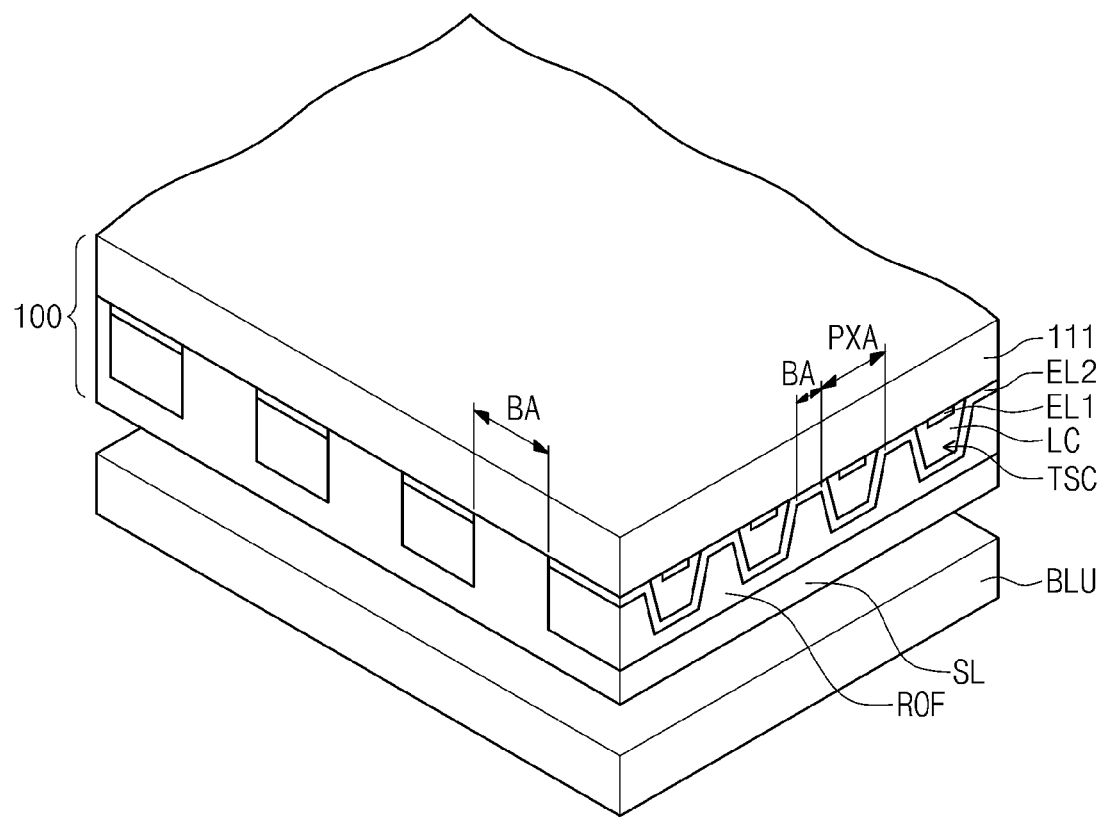
FIG. 2 is a perspective view showing a portion of an exemplary embodiment of a display panel and a backlight unit shown in FIG. 1.

FIG. 2 is a perspective view showing an exemplary embodiment of a portion of a display panel and a backlight unit shown in FIG. 1.

Referring to FIG. 2, the display panel 100 includes a substrate 111 and one or more of first electrode EL1 disposed on the substrate 111, one or more second electrode EL2, a tunnel-shaped cavity TSC, a roof layer ROF and a sealant layer SL.

The backlight unit BLU is disposed under and overlapping the display panel 100. In detail, the first electrode EL1, the second electrode EL2, the tunnel-shaped cavity TSC, the roof layer ROF and the sealant layer SL are disposed on the substrate 111, and the backlight unit BLU is disposed on a lower surface of the display panel 100 facing the sealant layer SL, for example, after the display panel 100 is turned upside down. That is, the backlight unit BLU is disposed to face a surface of the substrate 111, on which the first electrode EL1, the second electrode EL2, the tunnel-shaped cavity TSC, the roof layer ROF and the sealant layer SL are disposed.

Hereinafter, the surface of the substrate 111, which faces the backlight unit BLU, is referred to as an upper surface of the substrate 111. Accordingly, the backlight unit BLU is disposed to face the upper surface of the substrate 111. A surface of the substrate 111, which is opposite to the upper surface of the substrate 111, is referred to as a lower surface of the substrate 111.

The substrate 111 is a transparent or non-transparent insulating substrate, e.g., a silicon substrate, a glass substrate, a plastic substrate, etc. The substrate 111 includes a plurality of pixel areas PXA respectively corresponding to the pixels PX11 to PXnm, and a boundary area BA between the pixel areas PXA. The pixel areas PXA are arranged in a matrix form, just as the arrangement of the pixels PX11 to PXnm.

A plurality of first electrodes EL1 is respectively disposed in the pixel areas PXA to correspond to the pixels PX11 to PXnm, respectively. The first electrodes EL1 receive data voltages through switching devices (hereinafter, referred to as thin film transistors) disposed on the substrate 111. This configuration will be described in detail with reference to FIGS. 3 to 6.

A plurality of second electrodes EL2 is disposed on the substrate 111 to be spaced apart from each other at regular intervals, and elongated to be extended in a row direction. Each of the second electrodes EL2 may be a single, unitary, indivisible member, but is not limited thereto or thereby. The second electrodes EL2 are overlapped with the pixel areas PXA arranged in the row direction. The second electrodes EL2 are commonly connected to a common voltage line (not shown) disposed in the non-display area NDA. The second electrodes EL2 are applied with a common voltage through the common voltage line. The second electrodes EL2 are spaced apart from the first electrodes EL1 to form an electric field therebetween.

The second electrodes EL2 are adjacent to the substrate 111 in the boundary area BA, and are vertically spaced apart from the substrate 111 in the pixel areas PXA so as to define the tunnel-shaped cavity TSC. That is, a distal end of the tunnel-shaped cavity TSC is spaced apart from the substrate 111 by a predetermined distance, for example, by a cross-sectional depth of the tunnel-shaped cavity TSC taken perpendicular to the substrate 111. The tunnel-shaped cavity TSC is defined between the substrate 111 and the second electrodes EL2, in the pixel areas PXA. The tunnel-shaped cavity TSC will be described in detail with reference to FIGS. 4 to 6 later.

The tunnel-shaped cavity TSC may be considered elongated in a column direction different from and intersecting the row direction, such as being perpendicular to the row direction. Both of opposing ends of the tunnel-shaped cavity TSC in the column direction, are opened and expose elements within the tunnel-shaped cavity TSC. An image display layer is disposed in the tunnel-shaped cavity TSC to display an image in accordance with an electric field generated by the first electrodes EL1 and the second electrodes EL2. As the image display layer, a liquid crystal layer LC may be provided in the tunnel-shaped cavity TSC, but the image display layer should not be limited to the liquid crystal layer LC. That is, for example, an electrophoretic layer may be provided in the tunnel-shaped cavity TSC as the image display layer of an electrophoretic display device.

The roof layer ROF is disposed on the substrate 111, and elongated to be extended in the row direction and cover the second electrodes EL2. The sealant layer SL is disposed on the roof layer ROF. The sealant layer SL covers the substrate 111 to block the both opposing ends of the tunnel-shaped cavity TSC in the column direction, thereby sealing the tunnel-shaped cavity TSC such that elements within the tunnel-shaped cavity TSC are not exposed to outside the tunnel-shaped cavity TSC. The roof layer ROF and the sealant layer SL may include an organic material, but are not limited thereto or thereby.

Due to the electric field generated by the data voltage applied to the first electrodes EL1 and the common voltage applied to the second electrodes EL2, an arrangement of liquid crystal molecules of the liquid crystal layer LC is changed. A transmittance of the light provided from the backlight unit BLU is controlled by the arrangement of the liquid crystal molecules, to thereby display a desired image.

Different from the exemplary embodiment of the invention, where the backlight unit BLU is disposed adjacent to the lower surface of the substrate 111 rather than the upper surface of the substrate 111, the display panel 100 is vulnerable to external impacts or pressures, which are applied to an upper portion of the display panel 100. In detail, the first electrodes EL1, the second electrodes EL2, the tunnel-shaped cavity TSC, the roof layer ROF and the sealant layer SL are disposed on the upper surface of the substrate 111, and then the backlight unit BLU is disposed adjacent to the lower surface of the substrate 111, such as when the display panel 100 is not turned upside down. When the external impacts or pressures are applied to the upper portion of the display panel 100, the external impacts or pressures are directly applied to the roof layer ROF and the sealant layer SL disposed on the upper surfaced of the substrate 111. Where the external impacts or pressures are directly applied to the roof layer ROF and the sealant layer SL, the roof layer ROF and the sealant layer SL are easily deformed by the external impacts or pressures. Therefore, the external impacts or pressures exert undesirable influence on the tunnel-shaped cavity TSC, and thus the tunnel-shaped cavity TSC may be deformed. That is, durability of the display panel 100 is reduced.

In contrast, the exemplary embodiment of the invention includes the backlight unit BLU of the nanocrystal display device 500 disposed on the upper surface of the substrate 111. In detail, the first electrodes EL1, the second electrodes EL2, the tunnel-shaped cavity TSC, the roof layer ROF and the sealant layer SL are disposed on the upper surface of the substrate 111, and the backlight unit BLU is disposed facing the upper surface of the display panel 100, such as after the display panel 100 is turned upside down. Thus, although the external impacts or pressures are applied to the upper portion of the display panel 100 in the upside down position, the impacts or pressures are applied to the substrate 111 of the display panel 100. Since the substrate 111 is stronger than the roof layer ROF and the sealant layer SL, the substrate 111 is not deformed easily even though the external impacts or pressures are applied to the substrate 111. That is, the display panel 100 is not easily deformed by the external impacts or pressures, which are applied to the upper portion of the display panel 100. Thus, the durability of the display panel 100 may be improved.

Consequently, the durability of the exemplary embodiment of the nanocrystal display device 500 may be improved.

Figure 3:
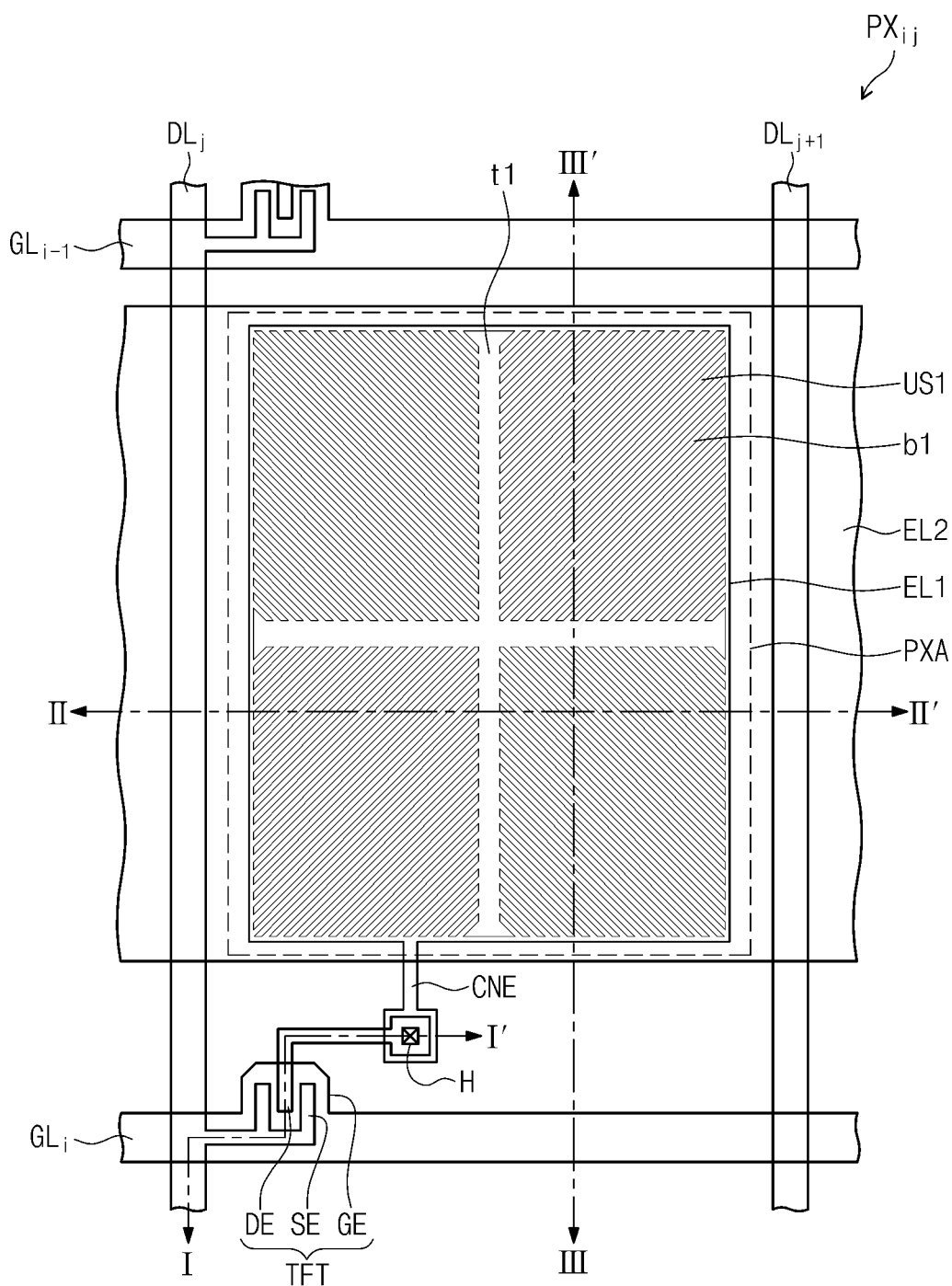
FIG. 3 is a plan view showing an exemplary embodiment of a pixel shown in FIG. 1.

FIG. 3 is a plan view showing an exemplary embodiment of a pixel shown in FIG. 1. In the illustrated exemplary embodiment, the pixels of the display panel have the same configuration and function, and thus for the convenience of explanation, one pixel PXij has been shown in FIG. 3.

Referring to FIG. 3, the gate lines GLi-1 and GLi are elongated and extended in the row direction, and the data lines DLj and DLj+1 are elongated and extended in the column direction to cross the gate lines GLi-1 and GLi, where "i" is an integer number greater than zero and equal to or smaller than "n", and "j" is an integer number greater than zero and equal to or smaller than "m".

The pixel PXij includes the thin film transistor TFT connected to the corresponding data line DLj and the corresponding gate line GLi, the first electrode EL1 connected to the thin film transistor TFT, the second electrode EL2 defining the tunnel-shaped cavity TSC along with another element, such as the substrate 111 of the display panel 100, and the liquid crystal layer LC provided in the tunnel-shaped cavity TSC. The second electrode EL2 which defines a portion of the tunnel-shaped cavity TSC and the liquid crystal layer LC provided in the tunnel-shaped cavity TSC will be described in detail with reference to FIGS. 4 to 6.

The area in which the pixel PXij is disposed includes the pixel area PXA and the boundary area BA between adjacent pixel areas PXA. The image is displayed in the pixel area PXA and the light traveling to the boundary area BA is blocked, and thus the image is not displayed in the boundary area BA. The first electrode EL1 is disposed in the pixel area PXA, and the data lines DLj and DLj+1, the gate lines GLi-1 and GLi and the thin film transistor TFT are disposed in the boundary area BA.

The thin film transistor TFT includes a gate electrode GE branched from the gate line GLi, a source electrode SE branched from the data line DLj, and a drain electrode DE connected to the first electrode EL1. Since the gate electrode GE is branched from the gate line GLi, the gate electrode GE and the gate line GLi are considered in a same layer of the display panel 100. The same can be said for the source electrode SE and the data line DLj. The drain electrode DE is extended from a first end at the thin film transistor TFT, and electrically connected at a second end thereof to a connection electrode CNE branched from the first electrode EL1, through a contact hole H defined in elements of the display panel 100. Since the connection electrode CNE is branched from the first electrode EL1, the connection electrode CNE and the first electrode EL1 are considered in a same layer of the display panel 100.

The first electrode EL1 includes an open first trunk portion t1 defined therein, a plurality of branch portions b1 extended from an outer portion of the first electrode EL1, so that the pixel area PXA is divided into a plurality of domains. The open first trunk portion t1 may have a cross shape in the plan view. The cross-shaped open first trunk portion t1 may be defined by distal ends of the plurality of first branches b1. Where the first trunk portion t1 has the cross shape, the pixel area PXA is divided into four domains by the first trunk portion t1. The first branch portions b1 are extended substantially in parallel to each other and spaced apart from each other in each domain. In one exemplary embodiment, for example, the first branch portions b1 are inclined at about 45 degrees with respect to the first trunk portion t1 while being extended from the outer portion of the first electrode EL1.

The first branch portions b1 adjacent to each other are spaced apart from each other at a distance of micrometers so as to form a plurality of first fine slits US1 between the spaced apart first branches b1. Due to the first fine slits US1, liquid crystal molecules of the liquid crystal layer LC in the pixel area PXA are pretilted in different directions from each other according to the domains. The structure of the first electrode EL1 as shown in FIG. 3 is defined as a super vertical alignment ("SVA") mode.

The first electrode EL1 includes a transparent conductive material, e.g., indium tin oxide ("ITO"), indium zinc oxide ("IZO"), indium tin zinc oxide ("ITZO"), etc.

The second electrode EL2 is elongated and extended in the row direction, and thus the second electrode EL2 is overlapped with the pixel areas PXA arranged in the row direction. The second electrode EL2 is applied with the common voltage. The second electrode EL2 includes a transparent conductive material, e.g., indium tin oxide ("ITO"), indium zinc oxide ("IZO"), indium tin zinc oxide ("ITZO"), etc.

Figure 4:
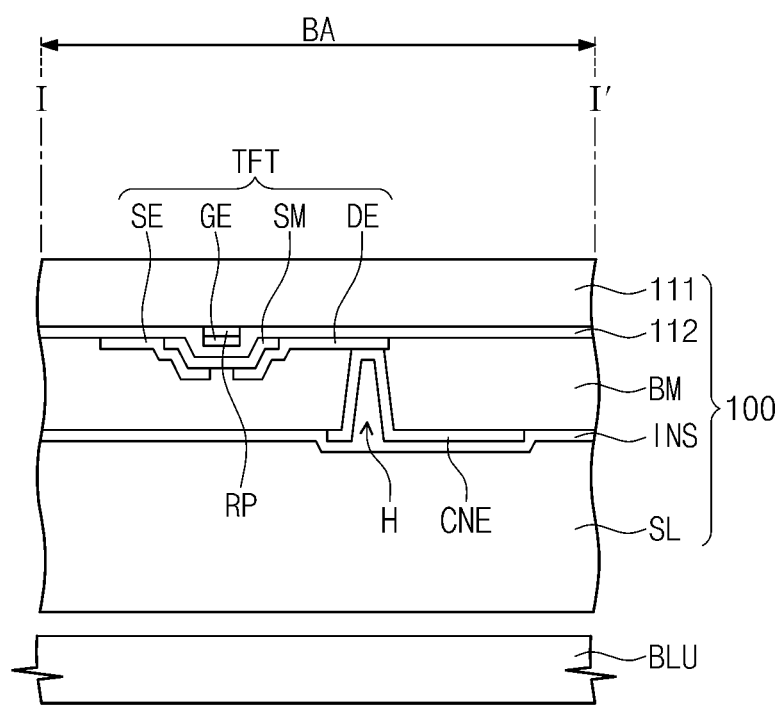
FIG. 4 is a cross-sectional view taken along line I-I' shown in FIG. 3.
Figure 5:
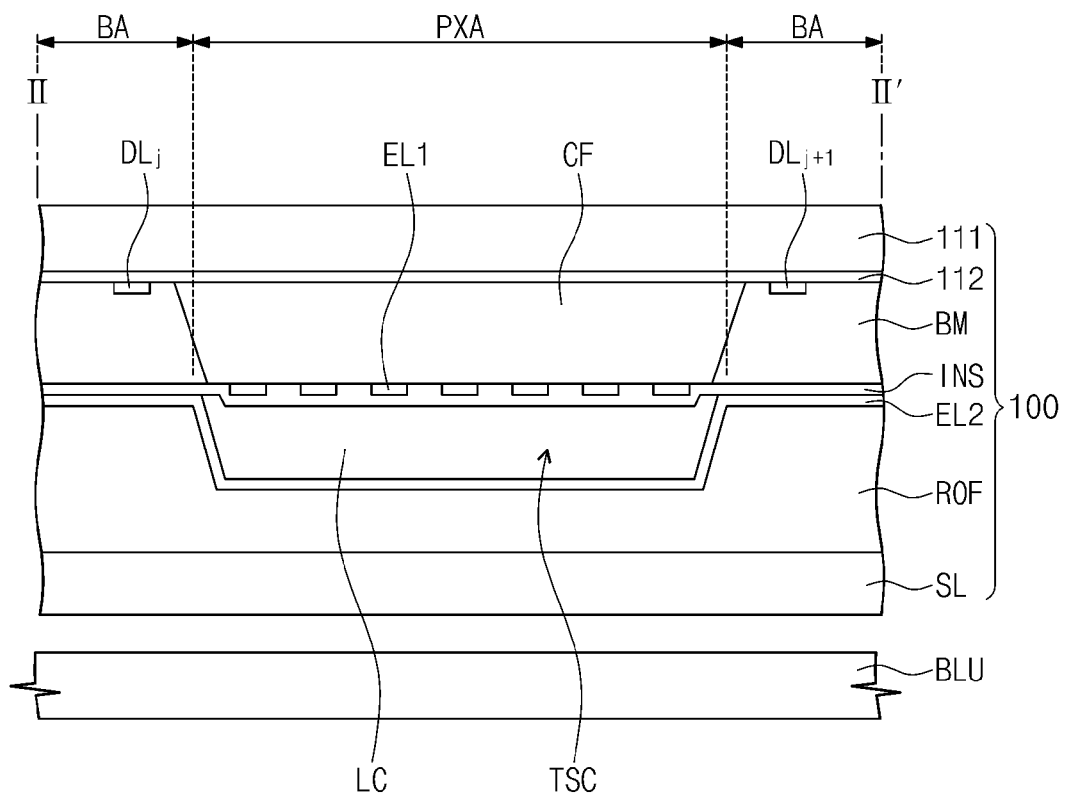
FIG. 5 is a cross-sectional view taken along line II-II' shown in FIG. 3.
Figure 6:
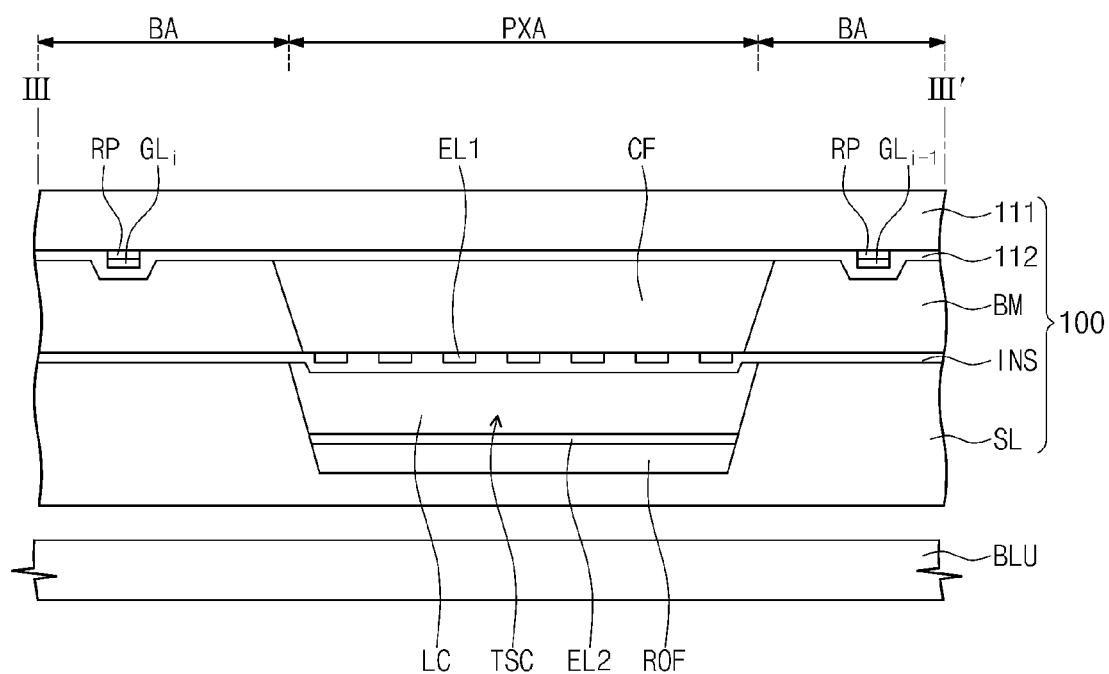
FIG. 6 is a cross-sectional view taken along line III-III' shown in FIG. 3.

FIG. 4 is a cross-sectional view taken along line I-I' shown in FIG. 3, FIG. 5 is a cross-sectional view taken along line II-II' shown in FIG. 3, and FIG. 6 is a cross-sectional view taken along line III-III' shown in FIG. 3.

Referring to FIGS. 4, 5, and 6, the gate lines GLi-1 and GLi are disposed on the substrate 111 and extended in the row direction. The gate lines GLi-1 and GLi have a width taken perpendicular to an extension direction thereof, for example, taken in the column direction. A gate insulating layer 112 is disposed on the first substrate 111 to cover the gate lines GLi-1 and GLi. The gate insulating layer 112 includes an insulating material, e.g., silicon nitride, silicon oxide, etc. The data lines DLj and DLj+1 are disposed on the gate insulating layer 112 and extended in the column direction to cross the gate lines GLi−1 and GLi. The data lines DLj and DLj+1 have a width taken perpendicular to an extension direction thereof, for example, taken in the row direction.

An anti-reflection layer RP and the thin film transistor TFT applying the data voltage to the pixel PXij are disposed on the substrate 111. The thin film transistor TFT includes the gate electrode GE, a semiconductor layer SM, the source electrode SE and the drain electrode DE.

In detail, the anti-reflection layer RP, and the gate electrode GE branched from the gate line GLi, are disposed on the substrate 111. The gate electrode GE is disposed on the anti-reflection layer RP. The anti-reflection layer RP is overlapped with the gate electrode GE when viewed in a plan view. The anti-reflection layer RP has substantially a same width as that of the gate electrode GE, for example, taken in the row direction. Although not shown in figures, the anti-reflection layer RP has a same width as that of the gate lines GLi−1 and GLi, and is elongated and extended in a same direction in which the gate lines GLi−1 and GLi are extended, and thus the anti-reflection layer RP is disposed between the substrate 111 and the gate lines GLi−1 and GLi.

The anti-reflection layer RP has a lower reflectivity than that of the gate electrode GE. In one exemplary embodiment, as an example, the gate electrode GE has the reflectivity of about 40% or more and the anti-reflection layer RP has the reflectivity in a range from about 0% to about 20%. The anti-reflection layer RP may include chromium oxide (CrOx).

The gate insulating layer 112 is disposed on the substrate 111 to cover the gate electrode GE. The semiconductor layer SM is disposed on the gate insulating layer 112 to correspond to the gate electrode GE of the thin film transistor TFT. Although not shown in figures, the semiconductor layer SM may include an active layer and an ohmic contact layer. The source electrode SE and the drain electrode DE of the thin film transistor TFT are disposed on the semiconductor layer SM and the gate insulating layer 112, and are spaced apart from each other. A portion of the semiconductor layer SM is exposed by the spaced apart source electrode SE and drain electrode DE. The semiconductor layer SM provides a conductive channel between the source electrode SE and the drain electrode DE.

A color filter CF and a black matrix BM are disposed on the thin film transistor TFT. The color filter CF is disposed in the pixel area PXA, and the black matrix BM is disposed in the boundary area BA. In the plan view, the color filter CF and the black matrix BM are overlapped with each other at a boundary between the pixel area PXA and the boundary area BA.

Although not shown in figures, a protective layer may be disposed to cover the thin film transistor TFT. The color filter CF and the black matrix BM may be disposed on the protective layer. The protective layer covers an upper portion of the semiconductor layer SM, which is exposed by the spaced apart source electrode SE and drain electrode DE.

The color filter CF allows light passing through the pixels PX to have a color. In an exemplary embodiment, the color filter CF may be a red color filter, a green color filter or a blue color filter, which is provided to correspond to the pixel area PXA. The color filter CF may further include a white color filter. Among the pixels PX11 to PXnm shown in FIG. 1, different color filters CF are disposed in the pixels PX adjacent to each other, to display different colors, but are not limited thereto or thereby.

The black matrix BM blocks a portion of the light, which is unnecessary to display the image. The black matrix BM prevents light leakage caused by malfunction of the liquid crystal molecules in edges of the pixel area PXA and/or from color mixture occurring at edges of the color filters CF.

The drain electrode DE of the thin film transistor TFT is electrically connected to the connection electrode CNE branched from the first electrode EL1 through the contact hole H defined in the black matrix BM. The first electrode EL1 is disposed on the color filter CF disposed in the pixel area PXA. That is, the first electrode EL1 is disposed in the pixel area PXA. The first electrode EL1 has the shape as shown in FIG. 3.

An insulating layer INS is disposed on the color filter CF and the black matrix BM to cover the first electrode EL1. In an alternative exemplary embodiment, the insulating layer INS may be omitted. The insulating layer INS includes an inorganic insulating material or an organic insulating material.

The second electrode EL2 is disposed on the insulating layer INS and is extended in the row direction. The second electrode EL2 extended in the row direction is shared by the pixels arranged in the direction in which the second electrode EL2 is extended. The second electrode EL2 extended in the row direction overlaps the pixel areas PXA arranged in the direction in which the second electrode EL2 is extended.

The second electrode EL2 makes contact with the insulating layer INS in the boundary area BA, and is spaced apart from the insulating layer INS in the area in which the second electrode EL2 is overlapped with the pixel area PXA, thereby defining the tunnel-shaped cavity TSC. The liquid crystal layer LC is provided in the tunnel-shaped cavity TSC. The liquid crystal layer LC includes the liquid crystal molecules (not shown).

Where the insulating layer INS is omitted, the second electrode EL2 makes contact with the black matrix BM in the boundary area BA, and is spaced apart from the color filter CF in the area in which the second electrode EL2 is overlapped with the pixel area PXA, to thereby define the tunnel-shaped cavity TSC.

The roof layer ROF is disposed along an upper surface of the second electrode EL2. The roof layer ROF is elongated and extended in the row direction which is the same extension direction as the second electrode EL2, to cover the upper surface of the second electrode EL2. Accordingly, the roof layer ROF is shared by the pixels PX arranged in the direction in which the roof layer ROF is extended.

The tunnel-shaped cavity TSC is elongated and extended in the column direction, and both of opposing ends of the tunnel-shaped cavity TSC in the column direction are open. That is, the roof layer ROF is not disposed at the upper and lower end portions of the tunnel-shaped cavity TSC in the column direction when viewed in a plan view, and thus both ends of the tunnel-shaped cavity TSC are op en.

Although not shown in figures, an inorganic insulating layer may be further disposed between the second electrode EL2 and the roof layer ROF. The inorganic insulating layer may include silicon nitride or silicon oxide. The inorganic insulating layer supports the roof layer ROF to allow the roof layer RF to stably maintain the tunnel-shaped cavity TSC.

The sealant layer SL is disposed on the roof layer ROF. The sealant layer SL covers the substrate 111 to block both of the opposing ends of the tunnel-shaped cavity TSC, thereby sealing the tunnel-shaped cavity TSC.

The backlight unit BLU is disposed on the sealant layer SL. That is, since the sealant layer SL is disposed on the substrate 111 to be between the backlight unit BLU and the substrate 111, the backlight unit BLU is disposed to face the upper surface of the substrate 111. Thus, the backlight unit BLU is disposed under the display panel 100. The backlight unit BLU supplies the light to the display panel 100.

The thin film transistor TFT is turned on in response to the gate signal provided through the gate line GLi. The data voltage provided through the data line DLj is applied to the first electrode EL1 through the turned-on thin film transistor TFT. The electric field is formed between the first electrode EL1 and the second electrode EL2 by a difference between the data voltage and the common voltage. The liquid crystal molecules of the liquid crystal layer LC are driven by the electric field formed between the first electrode EL1 and the second electrode EL2. As a result, the amount of the light passing through the liquid crystal layer LC is changed, thereby displaying the desired image.

External light may be applied to an upper portion of the display panel 100, e.g. to the substrate 111, while the light from the backlight unit BLU is provided to a lower portion of the display panel 100, e.g., at the sealant layer SL. When the external light incident through the substrate 11 is reflected by the gate electrode GE, a viewer watching the image through the display panel 100 is disrupted to watch normal images. That is, the visibility of the image displayed on the display panel 100 is lowered by the external light reflected by the gate electrode GE.

The anti-reflection layer RP according to the illustrated exemplary embodiment is disposed between the substrate 111 and the gate electrode GE and has the lower reflectivity than that of the gate electrode GE. As described above, the gate electrode GE has the reflectivity of about 40% or more and the anti-reflection layer RP has the reflectivity in a range from about 0% to about 20%. The external light applied to the upper portion of the display panel 100 and transmitted through the substrate 111 is reflected by the anti-reflection layer RP. Since the anti-reflection layer RP has the lower reflectivity than that of the gate electrode GE, the amount of the external light, which is reflected by the anti-reflection layer RP, is smaller than the amount of the external light, which is reflected by the gate electrode GE. Thus, when the display panel 100 adapts the anti-reflection layer RP, lowering of the visibility of the display panel 100 may be more reduced or effectively prevented as compared to a conventional display panel which does not include the anti-reflection layer RP.

As described above, the first electrodes EL1, the second electrodes EL2, the tunnel-shaped cavity TSC, the roof layer ROF and the sealant layer SL are disposed on an upper surface of the substrate 111, and the backlight unit BLU is disposed under the display panel 100 after the display panel 100 is turned upside down, that is, facing the upper surface of the substrate 111. Accordingly, although the external impacts or pressures are applied to the upper portion of the display panel 100, e.g., at a viewing side of a display device including the display panel 100, the impacts or pressures are applied to the substrate 111 of the display panel 100. Since the substrate 111 is stronger than the roof layer ROF and the sealant layer SL, the substrate 111 is not deformed easily even though the external impacts or pressures are applied to the substrate 111. That is, the display panel 100 is not easily deformed by the external impacts or pressures, which are applied to the upper portion of the display panel 100. Thus, the durability of the display panel 100 may be improved.

Consequently, the durability of the nanocrystal display device 500 including the exemplary embodiment of the display panel 100 according to the invention may be improved.

Figure 7:
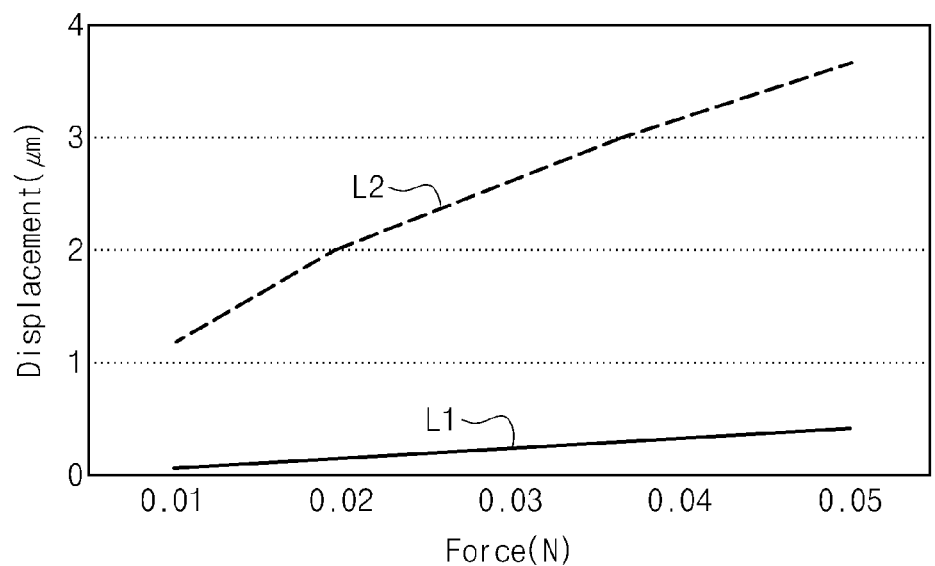
FIG. 7 is a graph showing a displacement in micrometers (μm) of a display panel when a force in newtons (N) is applied to the display panel.

FIG. 7 is a graph showing a displacement in micrometers (μm) of a display panel when a force in newtons (N) is applied to the display panel. In FIG. 7, a solid line L1 indicates the displacement of the display panel 100 when the backlight unit BLU is disposed to face the upper surface of the substrate 111 as shown in FIG. 2, and a dotted line L2 indicates the displacement of the display panel 100 when the backlight unit BLU is disposed adjacent to the lower surface of the substrate 111 opposite to the positions shown in FIG. 2. The displacement represents the amount of relative shift of the display panel 100 when the force is applied to the display panel 100.

Referring to FIG. 7, when the force applied to the upper portion of the display panel 100 is gradually increased, a slope of the dotted line L2 is greater than that of the solid line L1. That is, the amount in variation of the dotted line L2 is much greater than that of the solid line L1. The displacement values of the solid line L1 and the dotted line L2 according to the force applied to the upper portion of the display panel 100 are expressed as the following Table 1.

TABLE 1

| Force (N) | L1 (displacement: μm) | L2 (displacement: μm) |
|---|---|---|
| 0.01 | 0.0819 | 1.222 |
| 0.02 | 0.1642 | 2.041 |
| 0.03 | 0.2467 | 2.664 |
| 0.04 | 0.3296 | 3.189 |
| 0.05 | 0.4127 | 3.651 |

Referring to Table 1, when the force N applied to the upper portion of the display panel 100 is gradually increased, the displacement L1 of the exemplary embodiment of the display panel 100 according to the invention is smaller than the displacement L2 of the display panel 100 when the backlight unit BLU is disposed adjacent to the lower surface of the substrate 111. In other words, the exemplary embodiment of the display panel 100 according to the invention is influenced less by the force N applied thereto than the display panel 100 when the backlight unit BLU is disposed facing the lower surface of the substrate 111. Accordingly, deformation of the exemplary embodiment of the display panel 100 of the nanocrystal display device 500 according to the invention may be reduced or effectively prevented even though the external impacts and pressures are applied to the upper portion (e.g., the viewing side) of the display panel 100.

Figure 8:
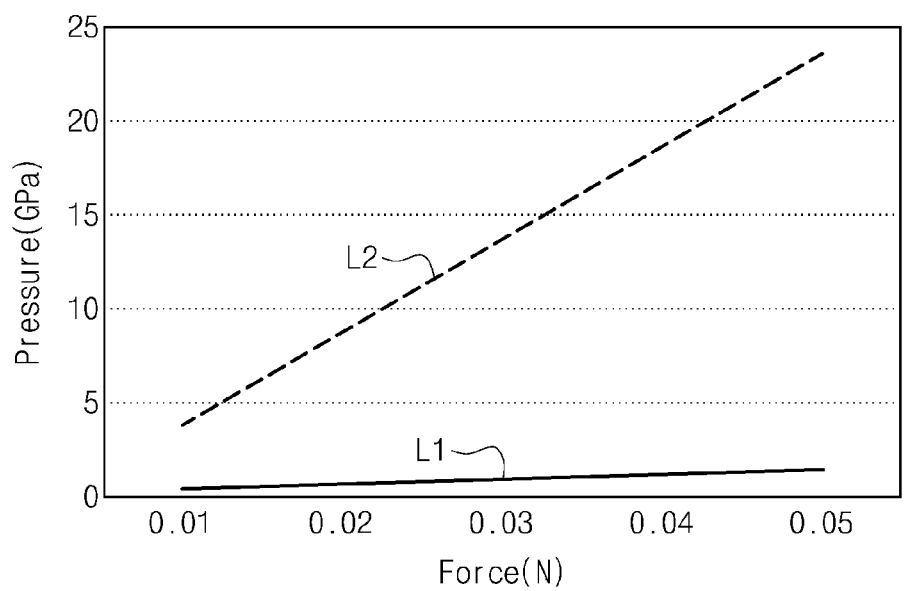
FIG. 8 is a graph showing a stress expressed by a pressure in gigapascals (GPa) of a display panel when the force in newtons (N) is applied to the display panel.

FIG. 8 is a graph showing a stress expressed by a pressure in gigapascals (GPa) of a display panel when the force is applied to the display panel. In FIG. 8, a solid line L1 indicates the stress of the display panel 100 when the backlight unit BLU is disposed to face the upper surface of the substrate 111 as shown in FIG. 2, and a dotted line L2 indicates the stress of the display panel 100 when the backlight unit BLU is disposed adjacent to the lower surface of the substrate 111 opposite to the position shown in FIG. 2.

Referring to FIG. 8, when the force applied to the upper portion of the display panel 100 is gradually increased, a slope of the dotted line L2 is greater than that of the solid line L1. That is, the amount in variation of the dotted line L2 is much greater than that of the solid line L1. The stress values of the solid line L1 and the dotted line L2 according to the force applied to the upper portion of the display panel 100 are expressed as the following Table 2.

TABLE 2

| Force (N) | L1 (stress: GPa) | L2 (stress: GPa) |
|---|---|---|
| 0.01 | 0.2438 | 3.74 |
| 0.02 | 0.4884 | 8.539 |
| 0.03 | 0.7337 | 13.49 |
| 0.04 | 0.9799 | 18.53 |
| 0.05 | 1.227 | 23.63 |

Referring to Table 2, when the force N applied to the upper portion of the display panel 100 is gradually increased, the stress L1 of the exemplary embodiment of the display panel 100 according to the invention is smaller than the stress L2 of the display panel 100 when the backlight unit BLU is disposed adjacent to the lower surface of the substrate 111. In other words, the exemplary embodiment of the display panel 100 according to the invention is influenced less by the force applied thereto than the display panel 100 when the backlight unit BLU is disposed to the lower surface of the substrate 111. Accordingly, deformation of the exemplary embodiment of the display panel 100 of the nanocrystal display device 500 according to the invention may be reduced or effectively prevented even though the external impacts and pressures are applied to the upper portion of the display panel 100.

One or more exemplary embodiments of the invention includes a nanocrystal display device including a display panel having elements disposed on a same surface of a substrate, and a backlight unit facing that same surface of the substrate. Since the substrate is stronger than the elements of the display panel and is positioned at a viewing side of the display device, an external impact is applied to the substrate which is not deformed easily. Thus, the durability of the nanocrystal display device including the display panel may be improved.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A nanocrystal display device comprising:
    a display panel comprising:
        a plurality of pixels, and
        a substrate comprising a plurality of pixel areas corresponding to the plurality of pixels, and a boundary area between the pixel areas;
        each pixel comprising:
            a first electrode on an upper surface of the substrate and in a corresponding pixel area;
            a second electrode on the upper surface of the substrate and spaced apart from the first electrode in a cross-section direction;
            a plurality of tunnel-shaped cavities respectively defined in the plurality of pixel areas;
            a roof layer overlapping the second electrode, in which the plurality of tunnel-shaped cavities is defined; and
            an image display layer in the tunnel-shaped cavities defined in the roof layer, and
    a backlight unit separate from the display panel, which provides a light to the display panel,
    wherein the roof layer in which the plurality of tunnel-shaped cavities is defined is disposed between the upper surface of the substrate of the display panel and the backlight unit separate from the display panel.

2. The nanocrystal display device of claim 1, wherein the pixels are arranged in a row direction and a column direction which crosses the row direction, the second electrode is elongated in the row direction.

3. The nanocrystal display device of claim 2, wherein the each pixel further comprises:
    a gate line on the upper surface of the substrate and elongated in the row direction;
    a data line on the upper surface of the substrate, elongated in the column direction, and insulated from the gate line and crossing the gate line; and
    a thin film transistor connected to the first electrode, the gate line and the data line.

4. The nanocrystal display device of claim 3, wherein the thin film transistor comprises:
    a gate electrode branched from the gate line;
    a source electrode branched from the data line; and
    a drain electrode connected to the first electrode.

5. The nanocrystal display device of claim 4, wherein the display panel further comprises:
    a black matrix on the thin film transistor in the boundary area;
    a color filter on the upper surface of the substrate and in the pixel areas;
    a connection electrode branched from the first electrode; and
    a contact hole defined in the black matrix,
    wherein the first electrode is on the color filter, and the drain electrode of the thin film transistor is electrically connected to the connection electrode through the contact hole.

6. The nanocrystal display device of claim 5, wherein the second electrode contacts the black matrix in the boundary area, and is spaced apart from the color filter in an area where the second electrode overlaps the pixel areas, to define the tunnel-shaped cavities.

7. The nanocrystal display device of claim 5, wherein the display panel further comprises an insulating layer on the black matrix and the color filter, and covering the first electrode,
    wherein the second electrode contacts the insulating layer in the boundary area, and is spaced apart from the insulating layer in an area where the second electrode overlaps the pixel areas, to define the tunnel-shaped cavities.

8. The nanocrystal display device of claim 4, wherein the display panel further comprises an anti-reflection layer between the upper surface of the substrate and the gate electrode, and having a reflectivity lower than a reflectivity of the gate electrode.

9. The nanocrystal display device of claim 8, wherein a width of the anti-reflection layer is substantially the same as a width of the gate electrode.

10. The nanocrystal display device of claim 8, wherein
    a width of the anti-reflection layer is substantially the same as a width of the gate line, and
    the anti-reflection layer is elongated in a same direction as the gate line, and between the gate line and the upper surface of the substrate.

11. The nanocrystal display device of claim 8, wherein the anti-reflection layer comprises chromium oxide.

12. The nanocrystal display device of claim 8, wherein the anti-reflection layer has a reflectivity in a range from about 0% to about 20%.

13. The nanocrystal display device of claim 2, wherein
    the display panel further comprises a sealant layer on the roof layer, and
    the roof layer is elongated in the row direction to cover an upper surface of the second electrode; and
    sealant layer is between the backlight unit and the roof layer in which the plurality of tunnel-shaped cavities is defined.

14. The nanocrystal display device of claim 13, wherein the tunnel-shaped cavity is elongated in the column direction, both opposing ends of the tunnel-shaped cavity in the column direction are open, which expose the image display layer in the tunnel-shaped cavity, and the sealant layer covers the substrate and blocks the both opposing ends of the tunnel-shaped cavity to seal the tunnel-shaped cavity.

15. The nanocrystal display device of claim 1, wherein the image display layer is a liquid crystal layer or an electrophoretic layer.

16. The nanocrystal display device of claim 1, wherein the first electrode comprises:
  a plurality of branch portions extended from an outer portion of the first electrode, in radius form,
  distal ends of the plurality of branches extended from the outer portion of the first electrode defining a cross-shaped open trunk portion; and
  a plurality of fine slits between adjacent branch portions.

17. A method of forming a nanocrystal display device, the method comprising:
  providing a display panel comprising:
    a plurality of pixels arranged in a row direction and a column direction which crosses the row direction, and
    a substrate comprising a plurality of pixel areas corresponding to the plurality of pixels, and a boundary area between the pixel areas;
    each pixel comprising:
      a first electrode on an upper surface of the substrate and in a corresponding pixel area;
      a second electrode on the upper surface of the substrate, elongated in the row direction and spaced apart from the first electrode in a cross-section direction, wherein the second electrode forms an electric field with the first electrode;
      a plurality of tunnel-shaped cavities defined in the plurality of pixel areas;
      a roof layer overlapping the second electrode, in which the plurality of tunnel-shaped cavities is defined; and
      an image display layer in the tunnel-shaped cavities defined in the roof layer, wherein the image display layer display an image in accordance with the electric field formed between the first electrode and the second electrode, and
  providing a backlight unit separate from the display panel, the backlight unit providing a light to the display panel,
  wherein the roof layer in which the plurality of tunnel-shaped cavities is defined is disposed between the upper surface of the substrate of the display panel and the backlight unit separate from the display panel.

* * * * *